Jan. 25, 1927.
W. V. ORR
1,615,290
WINDSHIELD CLEANER
Filed April 3, 1922   2 Sheets-Sheet 1
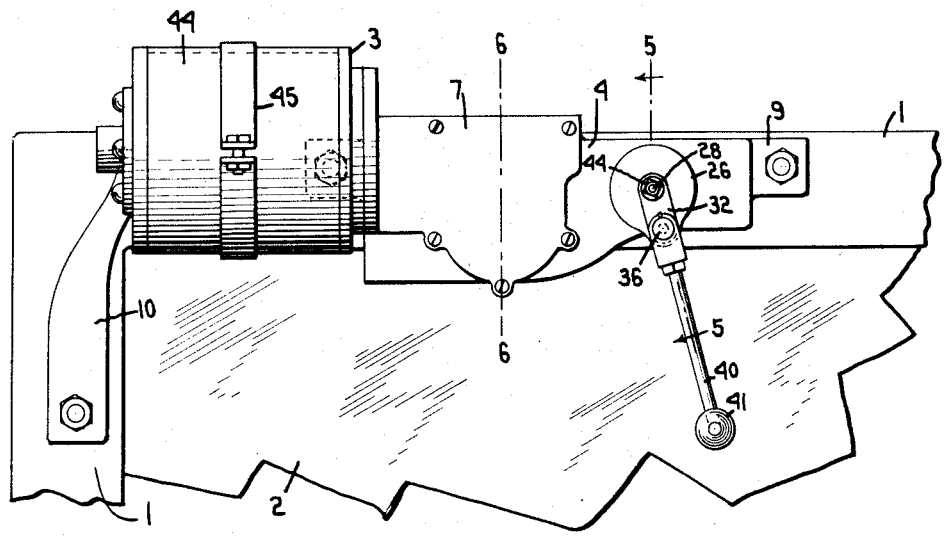
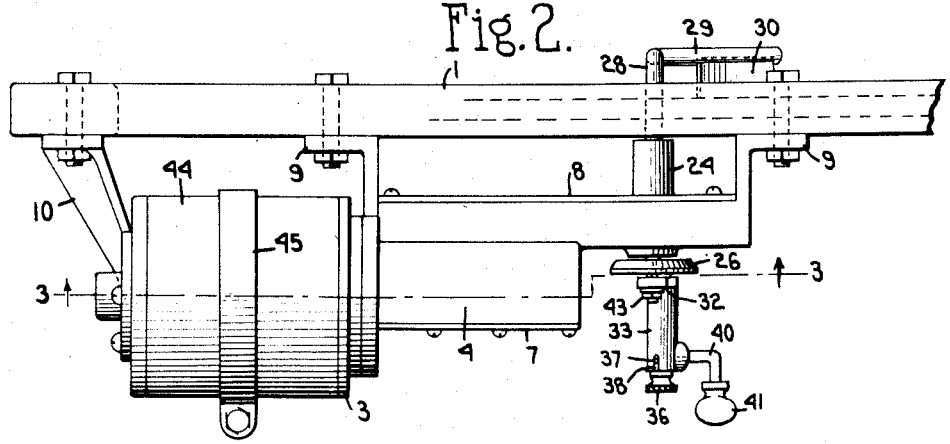
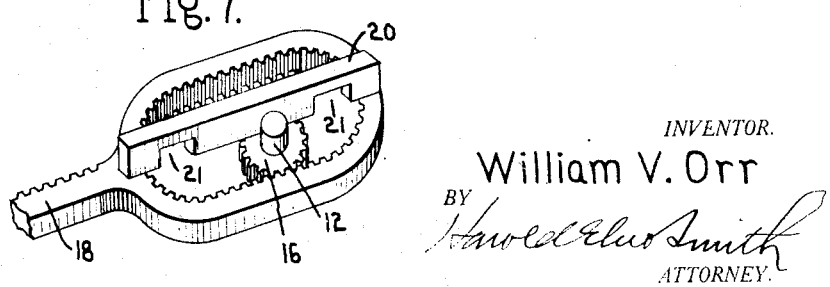
INVENTOR.
William V. Orr
BY
ATTORNEY.

Jan. 25, 1927.

W. V. ORR 1,615,290

WINDSHIELD CLEANER

Filed April 3, 1922   2 Sheets-Sheet 2

INVENTOR.
William V. Orr
BY
ATTORNEY.

Patented Jan. 25, 1927.

1,615,290

UNITED STATES PATENT OFFICE.

WILLIAM V. ORR, OF CLEVELAND, OHIO, ASSIGNOR TO THE AZOR MOTOR MANUFACTURING COMPANY, OF CLEVELAND, OHIO.

WINDSHIELD CLEANER.

Application filed April 3, 1922. Serial No. 548,998.

This invention relates to the class of devices known as windshield cleaners and has special reference to a power operated window-cleaner as used for the windshields of automobiles, and the windows of street cars, locomotives, pilot-houses, switch-houses, sentry-boxes, and look-out posts of every description. The objects of the invention are the provision of a device of this character which can be operated with a minimum expenditure of power; which can be operated conveniently by hand in case the power fails; which shall exhibit a quick and powerful cleaning stroke together with a comparatively long dwell at each end of the cleaning stroke; which shall possess a maximum of simplicity and consist of the fewest possible parts; and the provision of a new and improved arrangement for supporting the device; while further objects and advantages of the invention will become apparent as the description proceeds. Certain of the constructional features of the invention are limited in practice to use with an electric motor type of drive, but certain of the features are also applicable to those of other types such as the vacuum type and the compressed air type.

For example, when an electric motor is employed as a source of power it is necessary to gear it down very materially and it has heretofore been proposed to operate the cleaner by a crank driven by the final gear of the train; but such a crank produces a continuous harmonic motion defined by a sine curve wherein the power required varies from zero to a sharp peak load which requires an unduly large motor. One object of my invention is the provision of a speed reducing mechanism so designed and connected to the cleaning member as to render the speed substantially uniform throughout the stroke and with a simpler gear-train. The provision of a succession of quick, uniform, strokes separated by periods of dwell is of importance in all cleaners and I do not restrict this improvement to the electric motor type.

Figure 3:
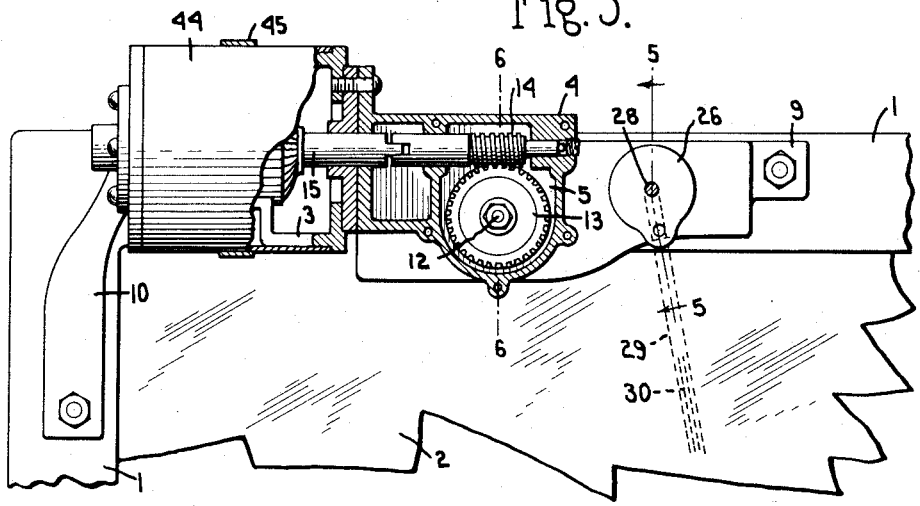
Figure 4:
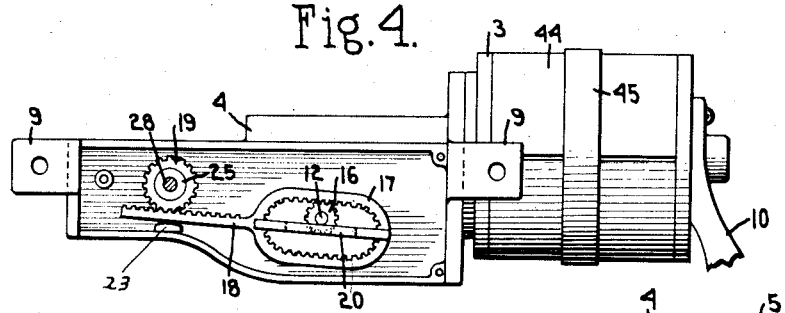
Figure 5:
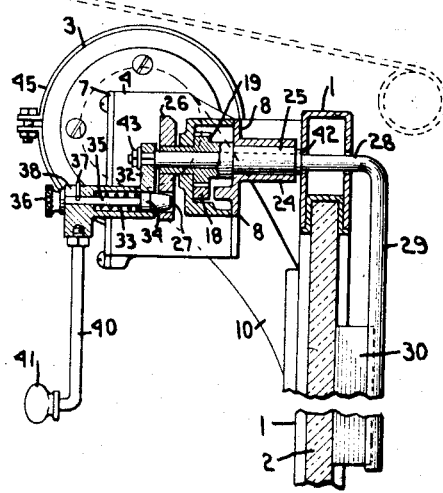
Figure 6:
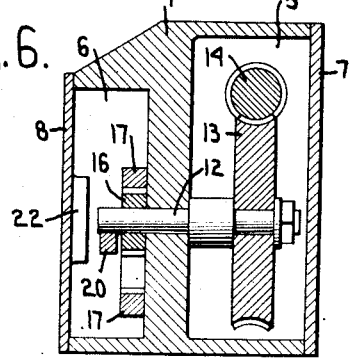

In the drawings accompanying and forming a part of this application I have shown one embodiment of my invention though it will be understood that the same is intended to be merely illustrative of the principles and not exhaustive of the physical construction in which those principles can be employed. Fig. 1 illustrates a corner of an automobile windshield equipped with an automatic cleaner of my invention; Fig. 2 is a top plan view of the parts shown in Fig. 1; Fig. 3 is a view similar to Fig. 1 showing certain of the parts in section; Fig. 4 is a rear elevation of the mechanism with the coverplate removed; Figs. 5 and 6 are sectional views corresponding to the lines 5—5 and 6—6 of Figs. 1 and 3; and Fig. 7 is a perspective view of the gear mechanism.

Describing the parts by reference characters, 1 represents the frame and 2 the glass of an automobile windshield; this being selected because is offers some of the most difficult conditions to meet in respect of weight, shape, space, vibration, and power available. This frame ordinarily consists of a hollow, rectangular, metal channel having its inner side open for the reception of the glass. 3 represents the frame of the motor and 4 a hollow gear case bolted to one end thereof and formed on opposite sides with chambers 5 and 6 closed by covers 7 and 8 respectively. This gear case is provided with suitable brackets 9 whereby the device can be bolted to the horizontal top-part of the frame 1 and the motor frame is also provided with a depending bracket 10 adapted for attachment to the upright end part of the windshield or other frame, whereby the operating shaft is held normal to the plane of the glass and the whole apparatus is steadied despite the weight of the motor, the vibration of the vehicle, and the oval shape of the frame frequently employed. The length of the motor and gear case is so chosen as to bring the motor substantially at the end of the frame and the operating shaft substantially opposite the observer.

Journaled in the gear-case 4 is a horizontal shaft 12 having at one end a worm wheel 13 located in the chamber 5 and meshing with the worm 14 driven by the shaft 15 of the motor. Carried by the other end of the shaft 12 and located in the chamber 6 is a pinion 16 with which meshes an oblong internal gear 17 or oval rack having at one end a second rack 18 meshing with a pinion 19. Bridging this oblong rack from end to end is a guiding member 20 which engages a pilot carried by the gear 16 so as to hold that gear in mesh with the rack. This pilot here consists of the projecting end of the shaft 12 and the member 20 is slotted for the passage, as indicated at 21, for the same. This guiding member here consists of a plain, straight-sided bar, the sides of the rack being straight to correspond therewith, but it is clear that changes in the shape of the rack must be accompanied by corresponding changes in this guiding member. My present preference is to make the entire rack and guiding member as a one piece die casting, but it can be made out of punchings or forged. The inner face of the cover 8 is formed with a boss 22 to engage this guiding member and hold the rack 17 in line with its pinion, and the wall of the case is formed with a pillow 23 adapted to hold the rack 18 in mesh with its pinion.

The outer face of the cover 8 is formed with a hollow boss 24 registering with a bearing in the opposite wall of the gear case, and in this boss and bearing are journaled the extended hubs 25 of the pinion 19 which constitutes a kind of elongated sleeve. Rigidly secured to the inner end of this sleeve is a disk 26 having therein a recess 27; and projecting loosely through this sleeve is the shaft 28 having at its outer-end the arm 29 provided with the wiper 30. Secured to the inner end of this shaft is the fitting 32 having therein the spring barrel 33 provided with the plunger 34 adapted to engage the hole 27 and lock the shaft to the sleeve. A stem 35 carried by this plunger has a head 36 and a lateral pin 37 working in the slot 38, so arranged that the plunger can be retracted and held unlocked by pulling and turning this head. A handle 40 is carried by this fitting and provided with a knob 41 to enable the cleaner to be worked by hand. The shaft 28 is shown as formed with a collar 42 engaging the end of the sleeve 25 to hold it in place against the pull of the head 36. In the present embodiment the arm 29 is integral with the shaft and the fitting 32 is detachably connected thereto by the nut 43 for purposes of assembling. The shaft projects loosely through a hole in the frame 1 of sufficient size to pass the collar 42. The motor is shown as surrounded by a split sheet metal jacket 44 clamped in place by the band 45.

Reduction in speed and increase in force of the motor is produced by the worm gear, and by the ratio between the gears 16 and 19. From another point of view it may be said to depend in part upon the relative size of the gear 16 and rack 17, but this merely influences the speed of movement of the rack and the speed with which the rack 18 drives the pinion 19 depends upon the size of that pinion. A rather small ratio between the sizes of the pinion 16 and rack 17 is desirable because of the larger proportion of time that the pinion will require to pass around the ends of the rack, since it is this which produces the dwell at each end of the stroke. The ratio of this dwell to the duration of the stroke is determined by the width of the rack 17 as compared to its length which may be varied at will.

It will be understood that the combination of a hand and a power drive is not restricted to the use of an electric motor as the power source but that my inventive idea comprehends the adaptation of this idea to other drives as well; also that the provision of a cleaner exhibiting quick strokes of uniform speed from end to end separated by periods of dwell is of value regardless of the power which drives it; also that as regards the employment of an electric motor there are numerous changes which can be made in point of design, arrangement, construction and mechanical movements so that I do not limit myself in any wise except as recited in the claims hereto annexed.

Having thus described my invention what I claim is:

1. In a window cleaning apparatus, in combination, a sleeve journaled for oscillation about an axis which is normal to the plane of the window, power devices for oscillating said sleeve, a shaft journaled in said sleeve, a wiper on one end of the shaft, a handle on the other end of said shaft, and means for detachably connecting said sleeve and shaft together.

2. In a window cleaning apparatus, in combination, a casing adapted for attachment to the window-frame, a hollow sleeve journaled in said casing, a recessed member carried by said sleeve, a shaft journaled in said sleeve, a wiper carried by said shaft, a part carried by said shaft adjacent to said recessed member, a handle for rocking said shaft manually, and a connecting device carried by said part and adapted to enter said recess to secure said sleeve to said shaft in driving relation.

3. In a windshield wiper, a wiper shaft, a pinion loosely carried thereby, a reciprocatory rack with which said pinion is constantly in mesh, clutch members between said shaft and pinion, spring means for urging said members into engagement, and means for manually disengaging said members and operating said shaft.

4. In a windshield wiper, a wiper shaft, motor driven instrumentalities for effecting reciprocatory rotary movements of said shaft, including a clutch, and manually operated means for disconnecting said clutch and rocking said shaft.

In testimony whereof, I hereunto affix my signature.

WILLIAM V. ORR.